(12) United States Patent
Jakobi et al.

(10) Patent No.: US 6,926,972 B2
(45) Date of Patent: Aug. 9, 2005

(54) METHOD OF PROVIDING AN ELECTROLUMINESCENT COATING SYSTEM FOR A VEHICLE AND AN ELECTROLUMINESCENT COATING SYSTEM THEREOF

(75) Inventors: Michael Jakobi, Farmington Hills, MI (US); Paul Serdiuk, Warren, MI (US)

(73) Assignee: BASF Corporation, Southfield, MI (US)

(*) Notice: Subject to any disclaimer, the term of this patent is extended or adjusted under 35 U.S.C. 154(b) by 352 days.

(21) Appl. No.: 10/043,397

(22) Filed: Jan. 10, 2002

(65) Prior Publication Data

US 2003/0129297 A1 Jul. 10, 2003

(51) Int. Cl.[7] .............................. B05D 5/12; H05B 33/00
(52) U.S. Cl. ..................... 428/690; 428/917; 427/66; 427/402; 427/421; 313/504
(58) Field of Search ................... 428/690, 917; 427/66, 421, 402; 313/504

(56) References Cited

U.S. PATENT DOCUMENTS

| | | | |
|---|---|---|---|
| 4,020,389 A | * | 4/1977 | Dickson et al. ............. 315/246 |
| 4,767,966 A | * | 8/1988 | Simopoulos et al. ....... 313/509 |
| 5,626,948 A | | 5/1997 | Ferber et al. ............... 428/195 |
| 5,646,481 A | * | 7/1997 | Zovko ........................ 313/510 |
| 5,650,213 A | | 7/1997 | Rizika et al. ............... 428/143 |
| 5,670,839 A | * | 9/1997 | Noma et al. ................ 313/503 |
| 5,891,361 A | | 4/1999 | Kane ................... 252/301.4 H |
| 6,071,432 A | | 6/2000 | Yocom et al. ......... 252/301.45 |
| 6,071,437 A | | 6/2000 | Oya ........................... 252/514 |
| 6,099,754 A | | 8/2000 | Yocom ................. 252/301.4 F |
| 6,132,642 A | | 10/2000 | Kane ....................... 252/301.4 |
| 6,162,374 A | | 12/2000 | Schoen et al. .............. 252/511 |

OTHER PUBLICATIONS

Japanese Patent Office machine translation of Masaya et al, JP 05–054973, Mar. 1993 (4 pages).*
Database WPI, Section Ch, Week 199921, Derwent Publication Ltd., London, GB; AN 1999–244841, XP002222780 & CN 1 204 598 A (Zhang R), Jan. 1999.
Patent Abstract of Japan, vol. 017, No. 353 (E–1393), Jul. 5, 1993 & JP 05 054973 A (Yazaki Corp), Mar. 5, 1993.

* cited by examiner

*Primary Examiner*—Dawn Garrett

(57) ABSTRACT

An electroluminescent (EL) coating system for a vehicle and a method of providing the EL coating system are disclosed. A dielectric coating composition is applied to a conductive substrate, such as an automotive body panel. Application of the dielectric coating composition, which includes an EL phosphor, forms a dielectric film layer on the substrate. A conductive coating composition, which includes an electro-conductive additive, is applied to the dielectric film layer to form a conductive film layer on the dielectric film layer. The dielectric coating composition is disposed between the substrate and conductive film layer such that the conductive film layer remains spaced from the substrate. The EL phosphor in the dielectric film layer is excitable by an electrical field established across the dielectric film layer. As such, the coating system of the vehicle is EL, or 'electroluminesces,' upon application of an electrical charge to the substrate and the conductive film layer.

54 Claims, 2 Drawing Sheets

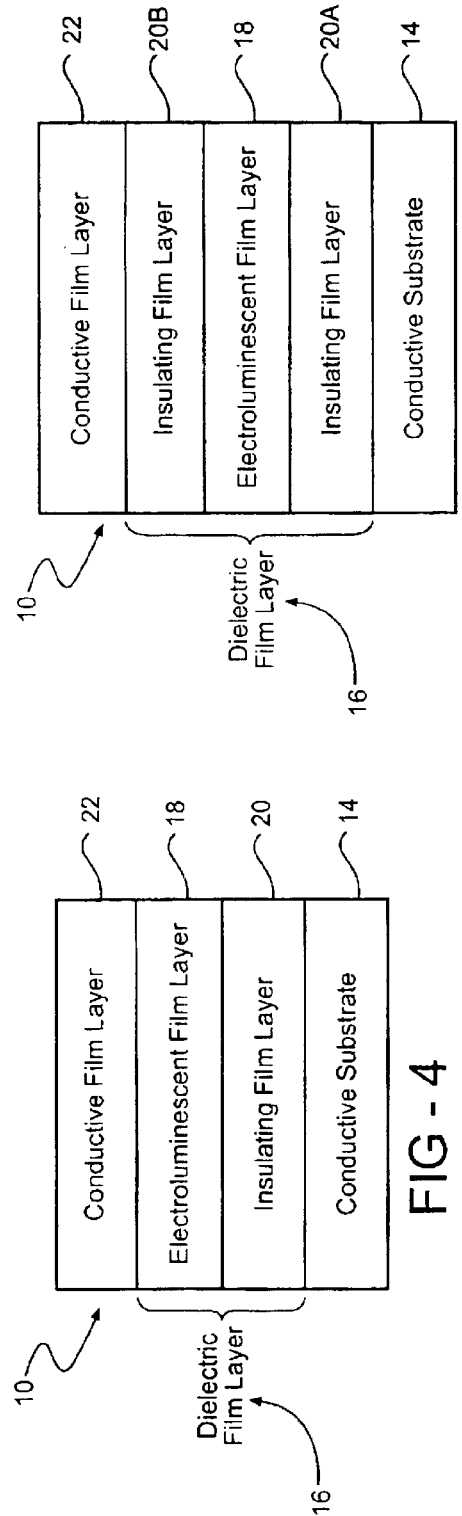
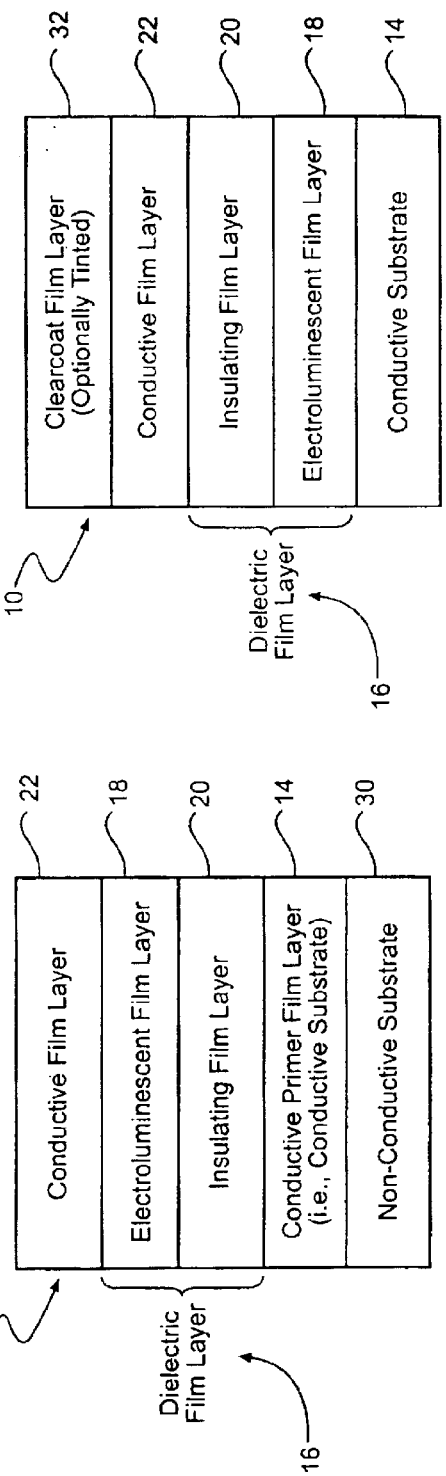
FIG-4
FIG-5
FIG-6
FIG-7

METHOD OF PROVIDING AN ELECTROLUMINESCENT COATING SYSTEM FOR A VEHICLE AND AN ELECTROLUMINESCENT COATING SYSTEM THEREOF

FIELD OF THE INVENTION

The subject invention generally relates to an electroluminescent (EL) coating system for a vehicle and a method of providing the EL coating system. More specifically, the EL coating system of the subject invention includes a conductive substrate, such as an automotive body panel of the vehicle, a dielectric film layer having an EL phosphor, and a conductive film layer.

BACKGROUND OF THE INVENTION

EL phosphors are known and are used throughout various industries. EL phosphors exhibit electroluminescence in response to application of an alternating current voltage to the EL phosphor. EL phosphors may also exhibit electroluminescence in response to an electrical field generated by the alternative current voltage. As a result, EL phosphors are used, for example, in personal digital assistant (PDA) displays, cellular phone displays, in watches, and even in luminescent lighting technology.

It is also known to use conventional phosphors in coating compositions. Conventional phosphors accumulate energy from an external light source, such as the sun, and luminesce for a limited period of time as a result of this accumulated energy. Conventional phosphors are not EL in the sense that they do not respond to application of alternating current voltage or to an electrical field. In U.S. Pat. Nos. 5,472,737 and 5,874,491 conventional phosphors are included in coating compositions that are used as highway or roadway paint compositions. Conventional phosphors have also been included in coating compositions that are used as vehicle, or automotive, paint compositions. For instance, in U.S. Pat. No. 6,242,056 conventional phosphors, specifically phosphor-coated beads, are included in reflective paint compositions to enhance light emission. On the other hand, EL phosphors have not been incorporated into coating systems for vehicles.

All of the above compositions and the coating systems formed from these coating compositions are inadequate. In particular, the initiation of luminescence resulting from the conventional phosphors cannot be effectively controlled. In other words, an operator cannot selectively activate the coating system to luminesce whenever the operator desires. Furthermore, because these coating systems do not make use of the electricity of the vehicle, the duration of the luminescence cannot be effectively controlled. In other words, the duration of the luminescence of the coating system is dependent on the amount of energy accumulated by the conventional phosphor.

Due to the inadequacies identified above, it is desirable to provide an EL coating system, including an EL phosphor, for a vehicle and a method of providing the EL coating system. More specifically, it is desirable to provide an EL coating system that enables an operator of the vehicle to control when, and for how long, the EL coating system luminesces by using an EL phosphor and the electricity of the vehicle.

SUMMARY OF THE INVENTION

An EL coating system for a vehicle and a method of providing the EL coating system are disclosed. The method includes the step of providing a conductive substrate of the EL coating system. A dielectric coating composition is applied to the conductive substrate. Consequently, a dielectric film layer is formed on the conductive substrate. The dielectric film layer includes an EL phosphor. A conductive coating composition, including an electroconductive additive, is applied to the dielectric film layer, thereby forming a conductive film layer on the dielectric film layer. Because the dielectric film layer is disposed between the conductive substrate and the conductive film layer, the conductive film layer is spaced from the conductive substrate.

The EL phosphor in the dielectric film layer is excitable by an electrical field established across the dielectric film layer. As such, the coating system of the vehicle is EL, or 'electroluminesces,' upon application of an electrical charge to the conductive substrate and the conductive film layer. Accordingly, the subject invention provides an EL coating system and a method of providing the EL coating system that uses an EL phosphor to effectively control the electroluminescence.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross-sectional view of the EL coating system taken along line 2—2 in FIG. 1 illustrating an alternative embodiment of the EL coating system having both an EL film layer and an insulating film layer as the dielectric film layer;

FIG. 5 is a cross-sectional view of the EL coating system taken along line 2—2 in FIG. 1 illustrating an alternative embodiment of the EL coating system where an EL film layer is disposed between two insulating film layers;

FIG. 6 is a cross-sectional view of the EL coating system taken along line 2—2 in FIG. 1 illustrating an alternative embodiment of the EL coating system having a non-conductive substrate and a conductive primer film layer as the conductive substrate; and FIG. 7 is a cross-sectional view of the EL coating system taken along line 2—2 in FIG. 1 illustrating an alternative embodiment of the EL coating system having a clearcoat film layer disposed on the conductive film layer.

DETAILED DESCRIPTION OF THE INVENTION

Referring to the Figures, wherein like numerals indicate like or corresponding parts throughout the several views, an electroluminescent (EL) coating system 10 for a vehicle 12 is disclosed. A method of providing the EL coating system 10 according to the subject invention includes the step of providing a conductive substrate 14. In the subject description, reference to conductive or conductivity refers, in all instances, to electrically-conductive or electrical conductivity. Preferably, the conductive substrate 14 of the EL coating system 10 is a body panel, not numbered, of the vehicle 12, i.e., an automotive body panel. Suitable automotive body panels are primarily aluminum, steel, and combinations of aluminum and steel. Alternatively, the conductive substrate 14 of the EL coating system 10 may include, without limitation, highway or construction markers, body panels of boats, airplanes, recreational vehicles, and the like, and home appliances and electronic equipment.

Figure 1:
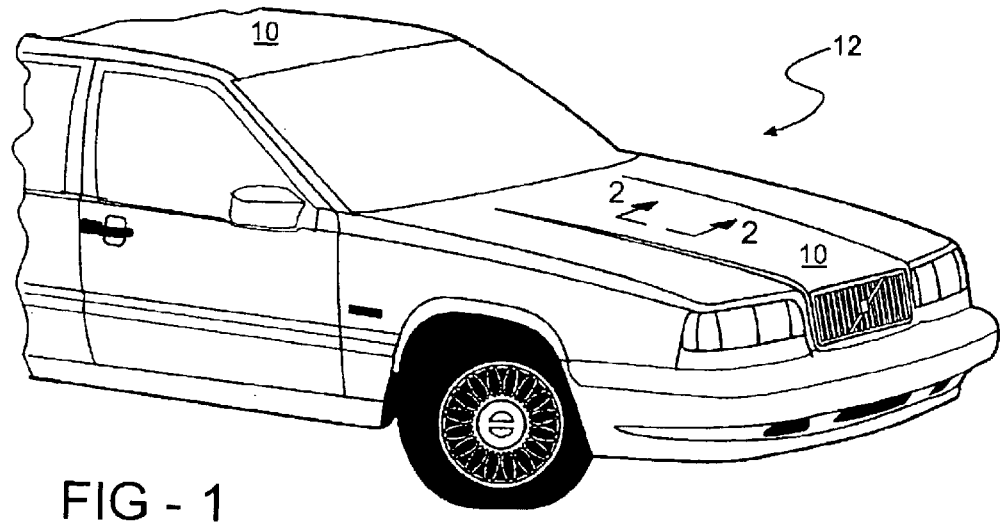
FIG. 1 is a perspective view of an EL coating system of a vehicle.
Figure 2:
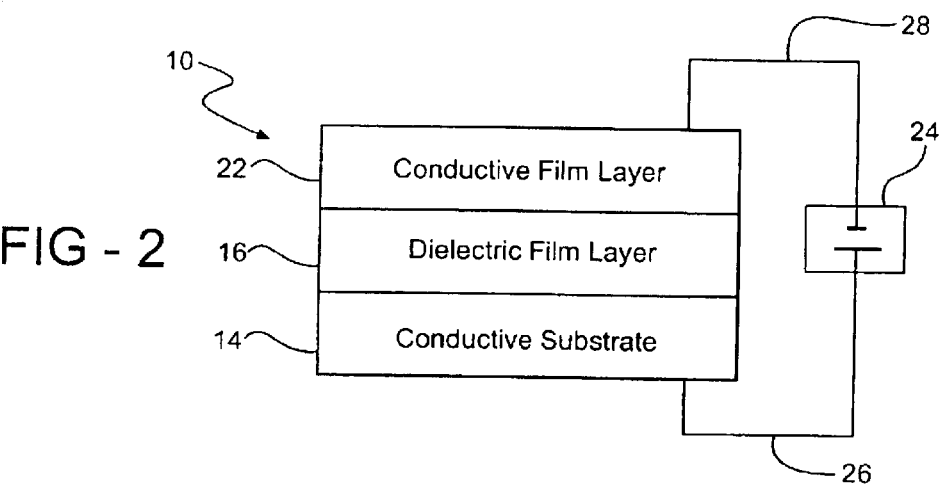
FIG. 2 is a cross-sectional view of the EL coating system taken along line 2—2 in FIG. 1 illustrating a conductive substrate, a dielectric film layer, and a conductive film layer of the EL coating system.

Referring specifically to FIG. 2, a broad embodiment of the EL coating system 10 is disclosed. A dielectric coating composition is applied to the conductive substrate 14 to form a dielectric film layer 16 on the conductive substrate 14. Preferably, the dielectric coating composition is applied to a film build suitable for hiding the conductive substrate 14. This film build conventionally ranges from 0.6 to 0.8 mils. As understood by those skilled in the art, the dielectric film layer 16 has very low, if any, electrical conductivity. The dielectric coating composition, and the dielectric film layer 16 formed from the dielectric coating composition, include an EL phosphor and a dielectric additive. The EL phosphor and the dielectric additive are described below. Also, as described below in the description of the various alternative embodiments, the dielectric film layer 16 may include an EL film layer 18, an insulating film layer 20, or both the EL and insulating film layers 18, 20, in any order.

After the dielectric film layer 16 is formed, a conductive coating composition is applied to the dielectric film layer 16 to form a conductive film layer 22 on the dielectric film layer 16. The conductive film layer 22 of the EL coating system 10 is spaced from the conductive substrate 14 because the dielectric film layer 16 is disposed between the conductive substrate 14 and the conductive film layer 22. The conductive coating composition that forms the conductive film layer 22 includes an electroconductive additive which, like the EL phosphor and the dielectric additive, is described below.

Preferably all coating compositions of the subject invention, such as the dielectric coating composition and the conductive coating composition, are liquids that are spray applied. These coating compositions may be spray applied by air- or rotary-atomized application equipment. It is to be understood that these coating compositions may also be electrodeposited provided conditions are suitable for electrodeposition of a coating composition onto an underlying substrate or film layer. It is also to be understood that these coating compositions may also be non-liquid in the sense that they are powder or powder-slurry coating compositions.

The EL phosphor in the dielectric film layer 16 is excitable, i.e., exhibits electroluminescence, by an electric field, or by application of an alternative current (AC) voltage to the EL phosphor. In the preferred embodiment, the EL phosphor of the subject invention is excitable by an electrical field established across the dielectric film layer 16. This electrical field is generated by an AC voltage. The AC voltage generates a changing electric field thereby causing the EL phosphor to emit light of a specific wavelength. AC voltage is required to excite the EL phosphor. As a result, if only a battery 24, or other direct current (DC) voltage source, is available, a DC to AC converter, frequently referred to as an inverter, is required to boost and convert the relatively low DC voltage to a high AC voltage. For excitation of the EL phosphor, high AC voltage is typically in the range of from 50 to 200 volts.

To establish the electrical field across the dielectric film layer 16, an electrical charge is applied to the conductive substrate 14 and the conductive film layer 22. More specifically, the EL coating system 10 includes a first electrical lead 26 and a second electrical lead 28. The first electrical lead 26 is connected to the conductive substrate 14 for application of the electrical charge to the conductive substrate 14, and the second electrical lead 28 is connected to the conductive film layer 22 for application of the electrical charge to the conductive film layer 22. To apply the electrical charge to the conductive substrate 14 and the conductive film layer 22, the first and second electrical leads 26, 28 preferably make use of the electricity, or the electrical power sources, present in the vehicle 12 as is known in the art, e.g. a car battery 24. Furthermore, to apply the electrical charge to the conductive substrate 14 and the conductive film layer 22, it is preferred that an operator of the vehicle 12 activates a switch, button, or other equivalent device, from either the interior or the exterior of the vehicle 12. As a result, the operator of the vehicle 12 is able to control when, and for how long, the EL coating system 10 luminesces. Application of the electrical charge to the conductive substrate 14 may also be activated by an anti-theft, or other safety, device.

The conductive substrate 14, preferably the automotive body panel, and the conductive film layer 22 function as electrodes. As such, the EL coating system 10 of the subject invention is essentially a capacitor. That is, the EL phosphor is in the dielectric film layer 16 between the conductive substrate 14 and the conductive film layer 22. As the AC voltage is applied to the conductive substrate 14 and the conductive film layer 22, the electrical field is established across the dielectric film layer 16. The dielectric film layer 16, and in particular the dielectric additive in the dielectric film layer 16, allows the EL coating system 10 to withstand the higher voltages associated with AC voltage without shorting between the conductive substrate 14 and the conductive film layer 22.

Electrons present in the EL phosphor absorb energy and are excited from their valence band, a resting or ground energy band, to their conduction band, a higher energy band. Because the EL coating system 10 relies on AC voltage, the electrical field is diminished or eliminated twice during each cycle, and the electrons present in the EL phosphor return to their valence band thereby releasing energy in the form of electroluminescence through the conductive film layer 22. Therefore, the EL coating system 10 of the vehicle 12 is EL, or 'electroluminesces.' When the EL coating system 10 of the subject invention electroluminesces, the EL coating system 10 enhances the visibility of the conductive substrate 14, such as the body panels of the vehicle 12, to improve safety and to provide certain aesthetic effects.

Because the energy from the EL phosphor is released through the conductive film layer 22, the conductive film layer 22 must be at least partially partially-transparent. For descriptive purposes, "at least partially-transparent" is intended to describe fully-transparent conductive film layers 22 as well as partially-transparent conductive film layers 22. Generally, partially-transparent conductive film layers 22 transmit at least 10%, preferably at least 30%, of incident light.

Figure 3:
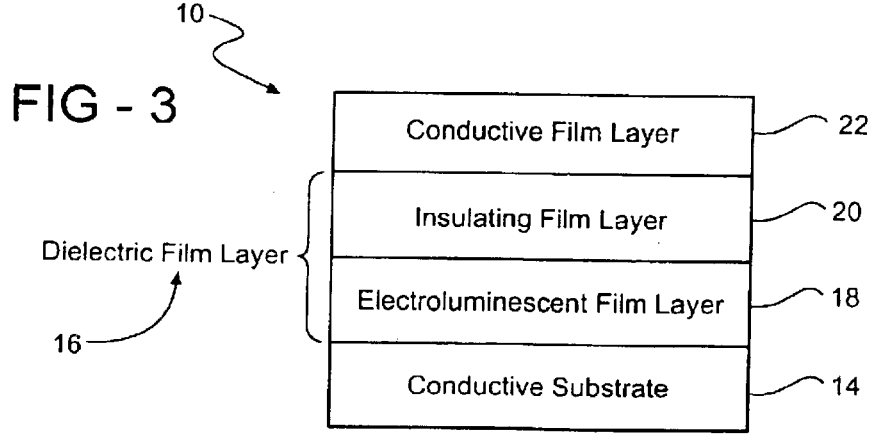
FIG. 3 is a cross-sectional view of the EL coating system taken along line 2—2 in FIG. 1 illustrating a preferred embodiment of the EL coating system having both an EL film layer and an insulating film layer as the dielectric film layer.

Referring now to FIG. 3, which discloses the most preferred embodiment of the subject invention, the dielectric film layer 16 is further defined to include both the EL film layer 18 and the insulating film layer 20. The EL film layer 18 is formed from an EL coating composition that includes the EL phosphor. The EL coating composition is applied between the conductive substrate 14 and the conductive film layer 22. More specifically, the EL coating composition is applied to the conductive substrate 14 to form the EL film layer 18 on the conductive substrate 14. The insulating film layer 20 is formed from an insulating coating composition that includes the dielectric additive. The insulating coating composition is applied between the conductive substrate 14 and the conductive film layer 22. More specifically, the insulating coating composition is applied to the EL film layer 18 to form the insulating film layer 20 on the EL film layer 18 adjacent the conductive film layer 22. The conductive coating composition is then applied to the insulating film layer 20 to form the conductive film layer 22. In this embodiment, and in all other embodiments where the insulating film layer 20 is disposed between the EL film layer 18 and the conductive film layer 22, the insulating film layer 20 must also be at least partially transparent, just as the conductive film layer 22, such that the EL phosphor in the EL film layer 18 can electroluminesce through both the insulating film layer 20 and the conductive film layer 22.

In the embodiment disclosed in FIG. 3, the dielectric additive is in the insulating film layer 20. The dielectric additive includes a titanate, an oxide, a niobate, an aluminate, a tantalate, a zirconate, or combinations thereof. More specifically, the dielectric additive is selected from the group consisting of barium titanate, strontium titanate, bismuth titanate, tantalum titanate, barium strontium titanate, barium zirconium titanate, barium lanthanum titanate, strontium bismuth titanate, lead zirconium titanate, lead lanthanum titanate, titanium dioxide, tantalum pentoxide, barium titanium niobate, barium strontium niobate, lead zinc niobate, lanthanum aluminate, yttrium aluminate, strontium aluminum tantalate, strontium bismuth tantalate, and combinations thereof. Certain metal oxides may also be utilized as the dielectric additive.

The insulating coating composition includes from 10 to 20, preferably from 13 to 17, parts by weight of the dielectric additive based on 100 parts by weight of the insulating coating composition. Furthermore, the dielectric additive in the insulating coating composition has a dielectric constant of at least 80, preferably of at least 300, and more preferably of at least 1200, when measured at 20° C. and 1 kHz. The preferred dielectric includes a ferroelectric ceramic powder having an average particle size of from 0.1 to 5.0, more preferably from 0.5 to 3.0, microns. The most preferred dielectric additive used in the subject invention is barium titanate, $BaTiO_3$ which is commercially available from Atlantic Equipment Engineers, Bergenfield, N.J.

The insulating coating composition may further include a pigment selected from the group consisting of organic pigments, inorganic pigments, and combinations thereof. In fact, the insulating coating composition of the subject invention may be a conventional pigmented basecoat coating composition that is known in the art. Most of the pigmented basecoat coating compositions known in the art are dielectric and therefore function as insulators. Consequently, any of these conventional pigmented basecoat coating compositions would be suitable insulating coating compositions. The pigment may be included in the insulating coating composition for functional and/or aesthetic purposes. For example, the pigment may be included to ensure that the insulating film layer 20 suitably hides the underlying conductive substrate 14. Typically, the insulating coating composition is applied to a film build ranging from 0.6 to 0.8 mils to suitably hide the underlying conductive substrate 14. Of course, the film build may range depending on the type of pigment, if any, included in the insulating coating composition in addition to the dielectric additive.

Suitable inorganic pigments that may be included in the insulating coating composition include, but are not limited to, titanium dioxide pigment, zinc oxide, zinc sulfide, barium sulfate, inorganic colored pigments, such as iron oxide (red, black, brown, and yellow), chrome yellow, moly orange, titanium yellow, nickel titanate yellow, chrome greens such as chromium oxide green, ferric ferrocyanide, lead chromate, and the like. Suitable organic pigments that may be included in the insulating coating composition include, but are not limited to, carbon black, phthalocyanine-based green pigment, phthalocyanine-based blue pigment, metallized and non-metallized azo pigments such as cromophthal pigments, azomethine pigments, methine pigments, anthraquinone pigments, perinone pigments, perylene pigments, diketopyrrolopyrrole pigments, thioindigo pigments, iminoisoindoline pigments, isoindolinone pigments, iminoisoindolinone pigments, quinacridone pigments such as quinacridone reds and violets, flavanthrone pigments, indanthrone pigments, perinone pigments, anthrapyrimidine pigments, carbazole pigments, monoarylide and diarylide yellows, benzimidazolone yellows, tolyl orange, naphthol orange, irgazine orange, and quinophthalone pigments.

Depending on the color desired for electroluminescence, the EL phosphor in the EL coating composition includes various components. Generally, for green, blue, blue-green, and green-yellow electroluminescence, the EL phosphor includes copper-doped zinc sulfide. Alternatively, for these colors of electroluminescence, the EL phosphor may include a zinc-sulfide based phosphor activated with a rare earth element, a strontium-aluminate based phosphor activated with a rare earth element, or combinations thereof. Rare earth elements are understood to include the elements having atomic numbers from 57 to 71 in the Periodic Table of Elements. For red electroluminescence, the EL phosphor may be described to be of the general formula SrS:Eu:X, where X is selected from the group consisting of chlorine, bromine, rare earth elements, and combinations thereof. One suitable EL phosphor is commercially available as Phosphorescent Pigment 6SSU from United Mineral & Chemical Corporation, Lyndhurst, N.J.

Preferably, the EL coating composition comprises from 5 to 25, more preferably from 10 to 20, parts by weight of the EL phosphor based on 100 parts by weight of the EL coating composition. Like the insulating coating composition, the EL coating composition may further include a pigment selected from the group consisting of organic pigments, inorganic pigments, and combinations thereof. The suitable inorganic and organic pigments described above are also applicable for the pigment, if included, in the EL coating composition. The most preferred pigment for inclusion in the EL coating composition is titanium dioxide, $TiO_2$. Titanium dioxide in the EL coating composition effectively functions as an extender pigment to ensure adequate spacing of individual particles of the EL phosphor.

In the embodiment disclosed in FIG. 3, the conductive coating composition, including the electroconductive additive, is applied to the insulating film layer 20. The most preferred electroconductive additive of the conductive coating composition includes antimony-doped tin oxide. This most preferred electroconductive additive is commercially available as Zelec® ECP 3010-XC from Milliken & Company, LaGrange, Ga. Other preferred electroconductive additives include an electrically-inert core and an electroconductive shell that at least partially surrounds the electrically-inert core. With electroconductive additives having this core-shell structure, the electroconductive shell is antimony-doped tin oxide, and the electrically-inert core is selected from the group consisting of silica cores, mica cores, titanium cores, and combinations thereof. A suitable electroconductive additive having this core-shell structure is commercially available as Zelec® ECP 1610-S from Milliken & Company, LaGrange, Ga. The electroconductive additives described above are electroconductive powders having average particle sizes ranging from 0.1 to 5.0, preferably from 0.5 to 3, microns. Alternative electroconductive additives are selected from the group consisting of carbon black particles, gold particles, silver particles, iron particles, copper particles, brass particles, bronze particles, gold-coated particles, silver-coated particles, and combinations thereof. These alternative electroconductive additives are essentially powders and/or flakes of precious and non-precious metals. Of course, suitable inorganic powders that are coated with the precious and non-precious metals may also be used for the alternative electroconductive additive.

The conductive coating composition includes from 25 to 75, preferably from 40 to 60, parts by weight of the electroconductive additive based on 100 parts by weight of the conductive coating composition. This amount of the electroconductive additive establishes a 'network' in the conductive film layer 22 where the discrete particles of the electroconductive additive are connected or 'touching.' This network of the electroconductive additive enables the conductive film layer 22 to realize a consistent charge spanning across and throughout the entire conductive film layer 22 upon application of the electrical charge. More specifically, this amount of the electroconductive additive in the conductive coating composition provides the conductive film layer 22 with an electrical conductivity of at least 90 mhos. For purposes of the subject invention, a conductive film layer 22 is generally considered to be any film layer having a conductivity of at least 90 mhos when measured with a sprayability meter commercially available as Ransburg GEMA Sprayability Meter, Model No. 236, from ITW/GEMA, Indianapolis, Ind. Preferably the conductivity of the conductive film layer 22 ranges from 90 to 165 mhos. On the other hand, a non-conductive film layer has a conductivity of less than 90 mhos. It is also contemplated that the conductive coating composition can be made conductive, even without the electroconductive additive, by formulating the conductive coating composition with conductive polymers, or by using conductive polymers as the electroconductive additive.

Depending on the chemistry-based technology that is selected for the conductive coating composition, film shrinkage of the conductive film layer 22, i.e., the shrinkage of the conductive film layer 22 upon cure or air-dry, may be an important factor to guarantee that the network of connected particles of the electroconductive additive is achieved. For instance, if the technology of the conductive coating composition is based on a high-solids coating composition, then it may be important to take measures to ensure that the conductive film layer 22 shrinks such that discrete particles of the electroconductive additive are drawn together upon cure or air-dry. Suitable measures to achieve adequate film shrinkage of the conductive film layer 22 include, but are not limited to, increasing volatile (water or solvent) content to lower the solids content of the coating composition, or including specialized additives such as cellulose acetate butyrate (CAB) that enhance film shrinkage.

Referring now to the embodiment disclosed in FIG. 4, the dielectric film layer 16 is defined to include both the EL film layer 18 and the insulating film layer 20. In this embodiment, the insulating coating composition is applied to the conductive substrate 14 to form the insulating film layer 20 on the conductive substrate 14, and the EL coating composition is applied to the insulating film layer 20 to form the EL film layer 18 on the insulating film layer 20 adjacent the conductive film layer 22. The conductive coating composition is then applied to the EL film layer 18 to form the conductive film layer 22.

Referring now to the embodiment disclosed in FIG. 5, the dielectric film layer 16 is defined to include the EL film layer 18 sandwiched between two insulating film layers 20A, 20B. As such, the insulating coating composition is first applied to the conductive substrate 14 to form a first insulating film layer 20A on the conductive substrate 14, then the EL coating composition is applied to the first insulating film layer 20A to form the EL film layer 18 on the first insulating film layer 20A, and finally the insulating coating composition is applied to the EL film layer 18 to form a second insulating film layer 20B on the EL film layer 18. The conductive coating composition is then applied to the second insulating film layer 20B to form the conductive film layer 22.

Referring now to the embodiment disclosed in FIG. 6, the EL coating system 10 further includes a non-conductive substrate 30. The most preferred non-conductive substrate 30 is plastic. As such, the EL coating system 10 of the subject invention may be used to coat items including, but not limited to, bumpers, trim components, mirrors, instrument panels, and other internal dashboard components. To coat the non-conductive substrate 30, a conductive primer coating composition, as is known in the art, is applied to the non-conductive substrate 30. One suitable conductive primer coating composition is commercially available as Hi-Duct® from BASF Corporation, Southfield, Mich. The conductive primer coating composition forms a conductive primer film layer 14 on the non-conductive substrate 30. The conductive primer film layer 14 functions as the conductive substrate 14 on the non-conductive substrate 30. The dielectric coating composition is applied to the conductive primer film layer 14 on the non-conductive substrate 30, and so on.

In all of the preceding embodiments, the conductive film layer 22 has been an outermost film layer of the EL coating system 10. However, referring now to the embodiment disclosed in FIG. 7, it is not required that the conductive film layer 22 be the outermost film layer. In this embodiment, the EL coating system 10 further includes a clearcoat film layer 32 that is disposed on the conductive film layer 22. The clearcoat film layer 32 is formed from a clearcoat coating composition as is known in the art. Suitable clearcoat coating compositions are commercially available as Duraclear®, Ureclear®, and StainGuard® from BASF Corporation, South field, Mich.

The clearcoat film layer 32 may be introduced for aesthetic purposes, such as to improve an overall appearance of the EL coating system 10, or for functional purposes, such as to improve resistance of the overall EL coating system 10 to acid rain. To achieve such functional purposes, the clearcoat coating composition may include specialized components such as ultraviolet light absorbers, hindered amine light stabilizers, surfactants, stabilizers, fillers, wetting agents, rheology control agents, dispersing agents, and adhesion promoters. The amount or amounts of these specialized components that are used in the clearcoat coating compositions are varied and controlled to avoid adversely affecting certain physical properties of the EL coating system 10. The clearcoat film layer may also be introduced to affect, or alter, the color of the EL coating system 10, including the color of the electroluminescence. To alter the color of EL coating system 10, the clearcoat coating composition may be tinted with any of the pigments, organic or inorganic, as described above. Of course, if the clearcoat coating composition is tinted to form a tinted clearcoat film layer on the conductive film layer 22 such that the conductive film layer 22 is no longer the outermost film layer, then the tinted clearcoat film layer must still be at least partially transparent such that the EL phosphor can electroluminesce through the tinted clearcoat film layer.

All of the coating compositions of the subject invention, specifically the dielectric coating composition, including both the EL coating composition and the insulating coating composition, the conductive coating composition, the conductive primer composition, and the clearcoat coating composition, may vary widely in their chemistry-based technology. For instance, these coating compositions may include, but are not to be limited to, solventborne and waterborne coating compositions, high-solids and low-solids coating compositions, refinish and OEM-type coating compositions, thermoset and thermoplastic coating compositions, powder and powder slurry coating compositions, and lacquer coating compositions.

It is preferred that all of these coating compositions are thermoset coating compositions that each include a functional resin and a cross-linking agent reactive with the functional resin. Functional resins that are known in the art to be useful for thermoset coating compositions include acrylics, vinyls, polyurethanes, polycarbonates, polyesters, alkyds and polysiloxanes. Preferred functional resins include acrylics, polyurethanes, and polyesters. Functional groups incorporated into the functional resins include, but are not limited to, hydroxy, phenol, isocyanate, acid, amine, epoxy, acrylate, vinyl, silane, anhydride, acetoacetate, carboxy, mercaptan, carbonate, and carbamate functional groups. The functional groups may be masked or blocked in such a manner that they become unblocked and therefore available for cross-linking under preferred cure conditions, such as elevated temperatures. Although the functional resins may be self cross-linkable, a cross-linking agent is preferably included in these thermoset coating compositions to react with the functional groups of the functional resins. Suitable cross-linking agents include, but are not limited to, aminoplast resins, such as a melamine, isocyanate cross-linking agents, blocked isocyanate cross-linking agents, acids, or anhydride cross-linking agents.

With the thermoset coating compositions, any film layers formed upon the application of the coating compositions are uncured, i.e., wet, film layers. Therefore, with thermoset coating compositions, the method of the subject invention includes the step of simultaneously curing the uncured film layers such that these uncured film layers cross-linking to provide the EL coating system 10. Of course, the conditions of the cure, such as the type of the cure (e.g. UV-cure), the duration of the cure, and the temperature of the cure vary depending on the type and the amount of the functional resin and the cross-linking agent.

The following examples illustrating the preparation of the EL coating system 10, as presented herein, are intended to illustrate, and not to limit, the invention.

EXAMPLES

The coating compositions were prepared by adding and reacting the following parts, by weight.

| Coating Composition | Component | Amount (grams) |
| --- | --- | --- |
| EL Coating Composition | BC 100 | 29.9 |
| | EL Phosphor | 15.0 |
| | BC190 | 55.1 |
| | Total | 100.0 |
| Insulating Coating Composition | BC100 | 85.9 |
| | Dielectric Additive | 14.1 |
| | Total | 100.0 |
| Conductive Coating Composition | BC 100 | 50.0 |
| | Electroconductive Additive | 50.0 |
| | Total | 100.0 |

The BC100 component is thermoplastic and is a clear blend of a polyester resin and of CAB. The BC100 component is commercially available from BASF Corporation, Southfield, Mich.

The EL Phosphor component is a copper-doped zinc sulfide EL phosphor that has natural, i.e., off-white, electroluminescence, and that is commercially available as Phosphorescent Pigment 6SSU from United Mineral & Chemical.

The BC190 component is BC100 including titanium dioxide pigment and is commercially available from BASF Corporation, Southfield, Mich.

The Dielectric Additive component is barium titanate, $BaTiO_3$, commercially available from Atlantic Equipment Engineers, Bergenfield, N.J.

The Electroconductive Additive component is an antimony-doped tin oxide electroconductive powder that is essentially green in color and that is commercially available as Zelec® ECP 3010-XC from Milliken & Company, LaGrange, Ga.

For the EL coating composition, 15.0 grams of the EL Phosphor component were mixed into 29.9 grams of the BC100 component with a Cowles blade for 1 hour. After the EL Phosphor component was suitably dispersed in the BC 100 component, 55.1 grams of the BC190 component were added to the EL Phosphor/BC100 dispersion under normal agitation. For the insulating coating composition, 14.1 grams of the Dielectric Additive component were mixed with 85.9 grams of the BC100 component. The Dielectric Additive/BC100 mixture was then subjected to 4 hours of a shaker grind to ensure that the Dielectric Additive component was suitably dispersed in the BC100. Finally, for the conductive coating composition, 50.0 grams of the Electroconductive Additive component were dispersed into 50.0 grams of the BC100 component using a media mill. Subsequently, a 2 mil wet drawdown of the conductive coating composition was conducted on glass. After thorough air dry, the conductive film layer 22 was formed, and the conductivity and visual transparency of the conductive film layer 22 were evaluated. The conductivity was 160 mhos, and the visual transparency was evaluated as acceptable.

For Example 1, the EL coating composition, prepared as described above, was spray applied to a 0.7 mil film build on an aluminum panel as the conductive substrate 14. The EL coating composition flashed for between 1 and 2 minutes to form the EL film layer 18, and then the insulating coating composition, prepared as described above, was spray applied to a 0.7 mil film build on the EL film layer 18. The insulating coating composition flashed for between 1 and 2 minutes to form the insulating film layer 20, and then the conductive coating composition, prepared as described above, was spray applied to a 0.7 mil film build on the insulating film layer 20. The conductive coating composition flashed for between 1 and 2 minutes to form the conductive film layer 22 and the EL coating system 10 of Example 1 was complete.

First and second electrical leads 26, 28, originating from a 110 volt AC power supply, were connected to the aluminum panel and to the conductive film layer 22, respectively. Upon application of the electrical charges to the aluminum panel and the conductive film layer 22, a degree of electroluminescence for Example 1 was visually evaluated as "very strong." The completed architecture of Example 1 is represented in FIG. 3.

For Example 2, a pretreated panel was used. The pretreated panel was a steel panel pre-primed with a non-conductive primer coating composition. Therefore, the steel panel functioned as the conductive substrate 14, and the non-conductive primer film layer formed from the non-conductive primer coating composition functioned as the insulating film layer 20. The EL coating composition, prepared as described above, was spray applied to a 0.7 mil film build on the insulating film layer 20. The EL coating composition flashed for between 1 and 2 minutes to form the EL film layer 18, and then the conductive coating composition, prepared as described above, was spray applied to a 0.7 mil film build on the EL film layer 18. The conductive coating composition flashed for between 1 and 2 minutes to form the conductive film layer 22 and the EL coating system 10 of Example 2 was complete.

First and second electrical leads 26, 28, originating from a 110 volt AC power supply, were connected to an underside (i.e., an all steel portion) of the steel panel and to the conductive film layer 22, respectively. Upon application of the electrical charges to the steel panel and the conductive film layer 22, the degree of electroluminescence for Example 2 was visually evaluated as "moderately strong." The completed architecture of Example 2 is represented in FIG. 4.

For Example 3, the insulating coating composition, prepared as described above, was spray applied to a 0.7 mil film build on an aluminum panel as the conductive substrate 14. The insulating coating composition flashed for between 1 and 2 minutes to form the first insulating film layer 20A, and then the EL coating composition, prepared as described above, was spray applied to a 0.7 mil film build on the first insulating film layer 20A. The EL coating composition flashed for between 1 and 2 minutes to form the EL film layer 18, and then the insulating coating composition, prepared as described above, was again spray applied. The insulating coating composition was spray applied to a 0.7 mil film build on the EL film layer 18. The insulating coating composition flashed for between 1 and 2 minutes to form the second insulating film layer 20B, and then the conductive coating composition, prepared as described above, was spray applied to a 0.7 mil film build on the second insulating film layer 20B. The conductive coating composition flashed for between 1 and 2 minutes to form the conductive film layer 22 and the EL coating system 10 of Example 3 was complete.

First and second electrical leads 26, 28, originating from a 110 volt AC power supply, were connected to the aluminum panel and to the conductive film layer 22, respectively. Upon application of the electrical charges to the aluminum panel and the conductive film layer 22, the degree of electroluminescence for Example 3 was visually evaluated as "present, but weak." The completed architecture of Example 3 is represented in FIG. 5.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of providing an electroluminescent coating system for a vehicle, said method comprising the steps of:
   (A) providing a conductive substrate;
   (B) forming a dielectric film layer on the conductive substrate; and
   (C) applying a conductive coating composition, comprising an electroconductive additive, to the dielectric film layer thereby forming a conductive film layer on the dielectric film layer,
   wherein the electroluminescent phosphor is excitable by an electrical field established across the dielectric film layer such that the coating system of the vehicle is electroluminescent upon application of an electrical charge to the conductive substrate and the conductive film layer, and
   wherein the step of forming the dielectric film layer comprises,
      applying an insulating coating composition, comprising a dielectric additive, between the conductive substrate and the conductive film layer thereby forming an insulating film layer, and
      applying an electroluminescent coating composition, comprising from 5 to 25 parts by weight of an electroluminescent phosphor based on 100 parts by weight of the electroluminescent coating composition, between the conductive substrate and the conductive film layer thereby forming an electroluminescent film layer.

2. A method as set forth in claim 1 wherein;
   the step of applying the electroluminescent coating composition is further defined as applying the electroluminescent coating composition to the conductive substrate to form the electroluminescent film layer, and
   the step of applying the insulating coating composition is further defined as applying the insulating coating composition to the electroluminescent film layer to form the insulating film layer adjacent the conductive film layer.

3. A method as set forth in claim 1 wherein the step of applying the insulating coating composition comprising the dielectric additive is further defined as applying an insulating coating composition comprising a titanate, an oxide, a niobate, an aluminate, a tantalate, a zirconate, or combinations thereof, as the dielectric additive.

4. A method as set forth in claim 1 wherein the step of applying the insulating coating composition comprising the dielectric additive is further defined as applying an insulating coating composition further comprising a pigment selected from the group consisting of organic pigments, inorganic pigments, and combinations thereof.

5. A method as set forth in claim 1 wherein the step of applying the insulating coating composition comprising the dielectric additive is further defined as applying an insulating coating composition comprising from 10 to 20 parts by weight of the dielectric additive based on 100 parts by weight of the insulating coating composition.

6. A method as set forth in claim 1 wherein step (C) is further defined as applying a conductive coating composition comprising antimony-doped tin oxide as the electroconductive additive.

7. A method as set forth in claim 1 wherein step (C) is further defined as applying a conductive coating composition to form a conductive film layer having an electrical conductivity of at least 90 mhos.

8. A method as set forth in claim 1 wherein step (C) is further defined as applying a conductive coating composition comprising from 25 to 75 parts by weight of the electroconductive additive based on 100 parts by weight of the conductive coating composition.

9. A method as set forth in claim 1 wherein the step of applying the electroluminescent coating composition comprising the electroluminescent phosphor is further defined as applying an electroluminescent coating composition comprising copper-doped zinc sulfide as the electroluminescent phosphor.

10. A method as set forth in claim 1 wherein the step of applying the electroluminescent coating composition comprising the electroluminescent phosphor is further defined as applying an electroluminescent coating composition further comprising a pigment selected from the group consisting of organic pigments, inorganic pigments, and combinations thereof.

11. A method as set forth in claim 1 wherein the step of applying the electroluminescent coating composition comprising the electroluminescent phosphor is further defined as applying an electroluminescent coating composition comprising from 10 to 20 parts by weight of the electroluminescent phosphor based on 100 parts by weight of the electroluminescent coating composition.

12. A method as set forth in claim 1 wherein;
step (B) is further defined as applying a thermoset dielectric coating composition, comprising a functional resin and a cross-linking agent reactive with the functional resin, to the conductive substrate thereby forming an uncured dielectric film layer on the conductive substrate, and
step (C) is further defined as applying a thermoset conductive coating composition, comprising a functional resin and a cross-linking agent reactive with the functional resin, to the uncured dielectric film layer thereby forming an uncured conductive film layer on the uncured dielectric film layer.

13. A method as set forth in claim 12 further comprising the step of simultaneously curing the uncured dielectric film layer and the uncured conductive film layer such that the uncured film layers cross-link to provide the coating system.

14. A method as set forth in claim 1 further comprising the step of applying a clearcoat coating composition to the conductive film layer thereby forming a clearcoat film layer on the conductive film layer.

15. A method as set forth in claim 1 wherein step (A) is further defined as providing a conductive substrate selected from the group consisting of aluminum, steel, and combinations thereof.

16. A method as set forth in claim 1 wherein step (A) is further defined as providing an automotive body panel as the conductive substrate.

17. A method as set forth in claim 1 further comprising the step of providing a non-conductive substrate.

18. A method as set forth in claim 17 wherein step (A) is further defined as applying a conductive primer coating composition to the non-conductive substrate thereby forming a conductive primer film layer as the conductive substrate on the non-conductive substrate.

19. A method as set forth in claim 1 further comprising the step of applying an electrical charge to the conductive substrate and the conductive film layer to establish an electrical field across the dielectric film layer such that the coating system is electroluminescent.

20. A method as set forth in claim 19 wherein the step of applying the electrical charge further comprises the step of activating a switch from an interior of the vehicle to apply the electrical charge.

21. A method as set forth in claim 1 wherein;
the insulting coating composition, the electroluminescent coating composition, and the conductive coating composition are spray applied.

22. An electroluminescent coating system for a vehicle, said coating system comprising:
a conductive substrate;
a conductive film layer spaced from said conductive substrate, said conductive film layer being formed from a conductive coating composition comprising an electroconductive additive; and
a dielectric film layer disposed between said conductive substrate and said conductive film layer, said dielectric film layer comprising;
an insulating film layer formed from an insulating coating composition applied between said conductive substrate and said conductive film layer, said insulating coating composition comprising a dielectric additive, and
an electroluminescent film layer formed from an electroluminescent coating composition applied between said conductive substrate and said conductive film layer, said electroluminescent coating composition comprising from 5 to 25 parts by weight of an electroluminescent phosphor based on 100 parts by weight of said electroluminescent coating composition,
wherein said electroluminescent phosphor is excitable by an electrical field established across said dielectric film layer such that said coating system of the vehicle is electroluminescent upon application of an electrical charge to said conductive substrate and said conductive film layer.

23. A coating system as set forth in claim 22 wherein said electroluminescent coating composition is applied to said conductive substrate to form said electroluminescent film layer, and said insulating coating composition is applied to said electroluminescent film layer to form said insulating film layer adjacent said conductive film layer.

24. A coating system as set forth in claim 22 wherein said dielectric additive of said insulating coating composition comprises a titanate, an oxide, a niobate, an aluminate, a tantalate, a zirconate, or combinations thereof.

25. A coating system as set forth in claim 22 wherein said dielectric additive of said insulating coating composition is selected from the group consisting of barium titanate, strontium titanate, bismuth titanate, tantalum titanate, barium strontium titanate, barium zirconium titanate, barium lanthanum titanate, strontium bismuth titanate, lead zirconium titanate, lead lanthanum titanate, titanium dioxide, tantalum pentoxide, barium titanium niobate, barium strontium niobate, lead zinc niobate, lanthanum aluminate, yttrium aluminate, strontium aluminum tantalate, strontium bismuth tantalate, and combinations thereof.

26. A coating system as set forth in claim 22 wherein said dielectric additive of said insulating composition has a dielectric constant of at least 80 at 20° C. and 1 kHz.

27. A coating system as set forth in claim 22 wherein said dielectric additive of said insulating composition comprises a ferroelectric ceramic powder having an average particle size of from 0.1 to 5.0 microns.

28. A coating system as set forth in claim 22 wherein said insulating coating composition further comprises a pigment selected from the group consisting of organic pigments, inorganic pigments, and combinations thereof.

29. A coating system as set forth in claim 22 wherein said insulating coating composition comprises from 10 to 20 parts by weight of said dielectric additive based on 100 parts by weight of said insulating coating composition.

30. A coating system as set forth in claim 22 wherein said electroconductive additive of said conductive coating composition comprises antimony-doped tin oxide.

31. A coating system as set forth in claim 22 wherein said electroconductive additive of said conductive coating composition is selected from the group consisting of carbon black particles, gold particles, silver particles, iron particles, copper particles, brass particles, bronze particles, gold-coated particles, silver-coated particles, and combinations thereof.

32. A coating system as set forth in claim 22 wherein said electroconductive additive of said conductive coating composition comprises an electrically-inert core and an electroconductive shell at least partially surrounding said electrically-inert core.

33. A coating system as set forth in claim 32 wherein said electrically-inert core is selected from the group consisting of silica cores, mica cores, titanium cores, and combinations thereof.

34. A coating system as set forth in claim 33 wherein said electroconductive shell is an antimony-doped tin oxide shell.

35. A coating system as set forth in claim 22 wherein said conductive film layer has an electrical conductivity of at least 90 mhos.

36. A coating system as set forth in claim 22 wherein said electroconductive additive of said conductive coating composition comprises an electroconductive powder having an average particle size of from 0.1 to 5.0 microns.

37. A coating system as set forth in claim 22 wherein said conductive coating composition comprises from 25 to 75 parts by weight of said electroconductive additive based on 100 parts by weight of said conductive coating composition.

38. A coating system as set forth in claim 22 wherein said electroluminescent phosphor of said electroluminescent coating composition comprises copper-doped zinc sulfide.

39. A coating system as set forth in claim 22 wherein said electroluminescent phosphor of said electroluminescent coating composition comprises a zinc-sulfide based phosphor activated with a rare earth element, a strontium-aluminate based phosphor activated with a rare earth element, or combinations thereof.

40. A coating system as set forth in claim 22 wherein said electroluminescent phosphor of said electroluminescent coating composition is of the general formula SrS:Eu:X, where X is selected from the group consisting of chlorine, bromine, rare earth elements, and combinations thereof.

41. A coating system as set forth in claim 22 wherein said electroluminescent coating composition further comprises a pigment selected from the group consisting of organic pigments, inorganic pigments, and combinations thereof.

42. A coating system as set forth in claim 41 wherein said pigment is $TiO_2$.

43. A coating system as set forth in claim 22 wherein said electroluminescent coating composition comprises from 10 to 20 parts by weight of said electroluminescent phosphor based on 100 parts by weight of said electroluminescent coating composition.

44. A coating system as set forth in claim 22 wherein each of said conductive coating composition, said electroluminescent coating composition, and said insulating composition are thermoset coating compositions comprising a functional resin and a cross-linking agent reactive with said functional resin.

45. A coating system as set forth in claim 44 wherein said functional resins are selected from the group consisting of acrylics, polyurethanes, polyesters, and combinations thereof.

46. A coating system as set forth in claim 45 wherein said cross-linking agents are selected from the group consisting of aminoplast resins, isocyanate cross-linking agents, and combinations thereof.

47. A coating system as set forth in claim 22 further comprising a clearcoat film layer disposed on said conductive film layer, said clearcoat film layer being formed from a clearcoat coating composition.

48. A coating system as set forth in claim 47 wherein said clearcoat coating composition is tinted with a pigment selected from the group consisting of organic pigments, inorganic pigments, and combinations thereof.

49. A coating system as set forth in claim 22 wherein said conductive substrate is selected from the group consisting of aluminum, steel, and combinations thereof.

50. A coating system as set forth in claim 22 wherein said conductive substrate is an automotive body panel.

51. A coating system as set forth in claim 22 further comprising a non-conductive substrate.

52. A coating system as set forth in claim 51 wherein said non-conductive substrate is plastic.

53. A coating system as set forth in claim 51 wherein said conductive substrate is a conductive primer film layer disposed on said non-conductive substrate, said conductive primer film layer being formed from a conductive primer coating composition applied to said non-conductive substrate.

54. A coating system as set forth in claim 22 further comprising a first electrical lead connected to said conductive substrate for applying said electrical charge to said conductive substrate and a second electrical lead connected to said conductive film layer for applying said electrical charge to said conductive film layer such that said coating system of the vehicle is electroluminescent.

* * * * *